US012670165B1

(12) United States Patent
Guo et al.

(10) Patent No.: US 12,670,165 B1
(45) Date of Patent: Jun. 30, 2026

(54) CROSS-GRAPH TRANSITIONS FOR GRAPH DATABASE QUERIES

(71) Applicant: PayPal, Inc., San Jose, CA (US)

(72) Inventors: Junshi Guo, Shanghai (CN); Pengshan Zhang, Shanghai (CN); Xia Zhang, Shanghai (CN); Kasiviswanathan Natarajan, Fremont, CA (US); Karteek Reddy Chada, Dublin, CA (US); Yu Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 19/056,002

(22) Filed: Feb. 18, 2025

(30) Foreign Application Priority Data

Dec. 30, 2024 (WO) ................ PCT/CN2024/143630

(51) Int. Cl.
*G06F 16/2455* (2019.01)
*G06F 16/22* (2019.01)

(52) U.S. Cl.
CPC .... *G06F 16/24553* (2019.01); *G06F 16/2264* (2019.01)

(58) Field of Classification Search
CPC ........................... G06F 6/2264; G06F 6/24553
See application file for complete search history.

(56) References Cited

U.S. PATENT DOCUMENTS

| 2018/0060341 A1 | 3/2018 | Wu |
| 2018/0060460 A1 | 3/2018 | Zhang |
| 2020/0210228 A1 | 7/2020 | Wu |
| 2020/0409931 A1 | 12/2020 | Zang |

| 2021/0173767 A1 | 6/2021 | Zhang |
| 2021/0334312 A1 | 10/2021 | Neo |
| 2021/0365499 A1 | 11/2021 | Matiushkin et al. |
| 2022/0004580 A1 | 1/2022 | Li |

(Continued)

FOREIGN PATENT DOCUMENTS

| CN | 110168523 A | 8/2019 |
| CN | 119025726 A | 11/2024 |
| WO | 2023211547 A1 | 11/2023 |

OTHER PUBLICATIONS

International Search Report and Written Opinion for Application No. PCT/CN2024/143630 mailed on Sep. 25, 2025, 7 pages.

*Primary Examiner* — Tony Mahmoudi
*Assistant Examiner* — Nirav K Khakhar
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed for enabling cross-graph querying in graph databases using a transition operator within a traversal context. In some embodiments, a computing system receives a query containing a transition operator that facilitates transitioning from a first graph to a second graph. The system processes a traversal operation within the first graph, retrieves intermediary data, and transitions to the second graph to perform subsequent traversal operations. The query engine can utilize confidence scores associated with edges in the graphs to filter or prioritize results, ensuring the reliability of returned data. Additionally, data validation techniques using a mirror graph are disclosed, where new data is validated before integration into a production graph. These techniques streamline cross-graph data analysis, improve query efficiency, and maintain graph database integrity while supporting applications such as fraud detection, recommendation systems, and account linking.

20 Claims, 7 Drawing Sheets

(56) References Cited

U.S. PATENT DOCUMENTS

| | | | |
|---|---|---|---|
| 2023/0120186 | A1 | 4/2023 | Huang |
| 2024/0045907 | A1 | 2/2024 | Zhang |
| 2024/0086563 | A1 | 3/2024 | Zhang |
| 2024/0086577 | A1 | 3/2024 | Zhang |
| 2024/0106920 | A1 | 3/2024 | Luan |
| 2024/0143572 | A1 | 5/2024 | Ayyannan |
| 2024/0144277 | A1 | 5/2024 | Lian |
| 2024/0330302 | A1 | 10/2024 | Li |

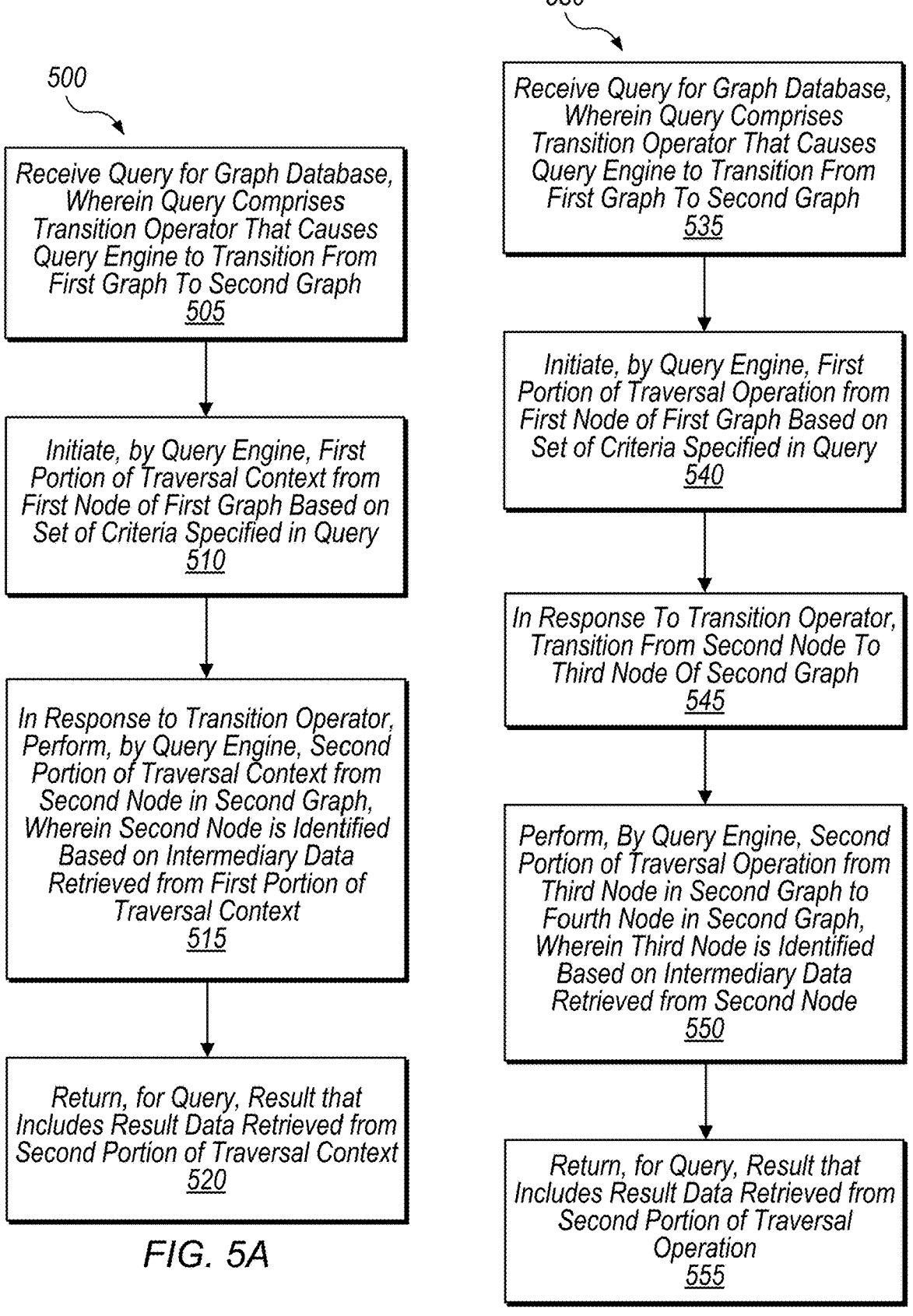

*500*

Receive Query for Graph Database, Wherein Query Comprises Transition Operator That Causes Query Engine to Transition From First Graph To Second Graph
505

Initiate, by Query Engine, First Portion of Traversal Context from First Node of First Graph Based on Set of Criteria Specified in Query
510

In Response to Transition Operator, Perform, by Query Engine, Second Portion of Traversal Context from Second Node in Second Graph, Wherein Second Node is Identified Based on Intermediary Data Retrieved from First Portion of Traversal Context
515

Return, for Query, Result that Includes Result Data Retrieved from Second Portion of Traversal Context
520

Receive Query for Graph Database, Wherein Query Comprises Transition Operator That Causes Query Engine to Transition From First Graph To Second Graph
535

Initiate, by Query Engine, First Portion of Traversal Operation from First Node of First Graph Based on Set of Criteria Specified in Query
540

In Response To Transition Operator, Transition From Second Node To Third Node Of Second Graph
545

Perform, By Query Engine, Second Portion of Traversal Operation from Third Node in Second Graph to Fourth Node in Second Graph, Wherein Third Node is Identified Based on Intermediary Data Retrieved from Second Node
550

Return, for Query, Result that Includes Result Data Retrieved from Second Portion of Traversal Operation
555

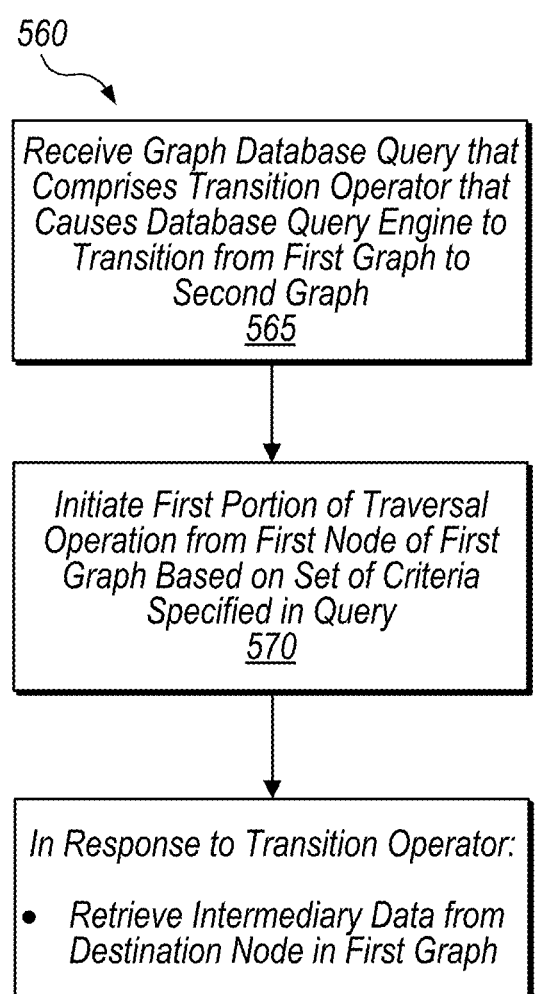

Receive Graph Database Query that
Comprises Transition Operator that
Causes Database Query Engine to
Transition from First Graph to
Second Graph
565

Initiate First Portion of Traversal
Operation from First Node of First
Graph Based on Set of Criteria
Specified in Query
570

In Response to Transition Operator:

- Retrieve Intermediary Data from
  Destination Node in First Graph

- Identify Second Node in Second
  Graph Associated with
  Intermediary Data

- Perform Second Portion of
  Traversal Operation from Second
  Node in Second Graph

- Return, for Graph Database
  Query, Result that Includes
  Result Data Retrieved from
  Second Portion of Traversal
  Operation

Memory
*620*

Interconnect 660

I/O
Interface
*640*

Processor
Subsystem
*680*

I/O
Devices
*650*

CROSS-GRAPH TRANSITIONS FOR GRAPH DATABASE QUERIES

PRIORITY CLAIM

The present application claims priority to PCT Appl. No. PCT/CN2024/143630, entitled "CROSS-GRAPH TRANSITIONS FOR GRAPH DATABASE QUERIES", filed Dec. 30, 2024, which is incorporated by reference herein in its entirety.

BACKGROUND

Technical Field

This disclosure relates generally to computer systems and, more specifically, to graph database queries.

Description of the Related Art

Graph databases are widely used for managing and analyzing interconnected data, enabling capabilities such as relationship modeling, pattern recognition, and traversal-based queries. These databases represent data as nodes and relationships as edges, making them particularly effective for applications like social networks, fraud detection, and recommendation systems. Query languages such as Gremlin have been developed to facilitate graph traversals and data retrieval, providing a standardized syntax for navigating complex relationships.

BRIEF DESCRIPTION OF THE DRAWINGS

FIGS. 5A-C are flow diagrams illustrating embodiments of methods implementing techniques described herein.

DETAILED DESCRIPTION

Figure 1:
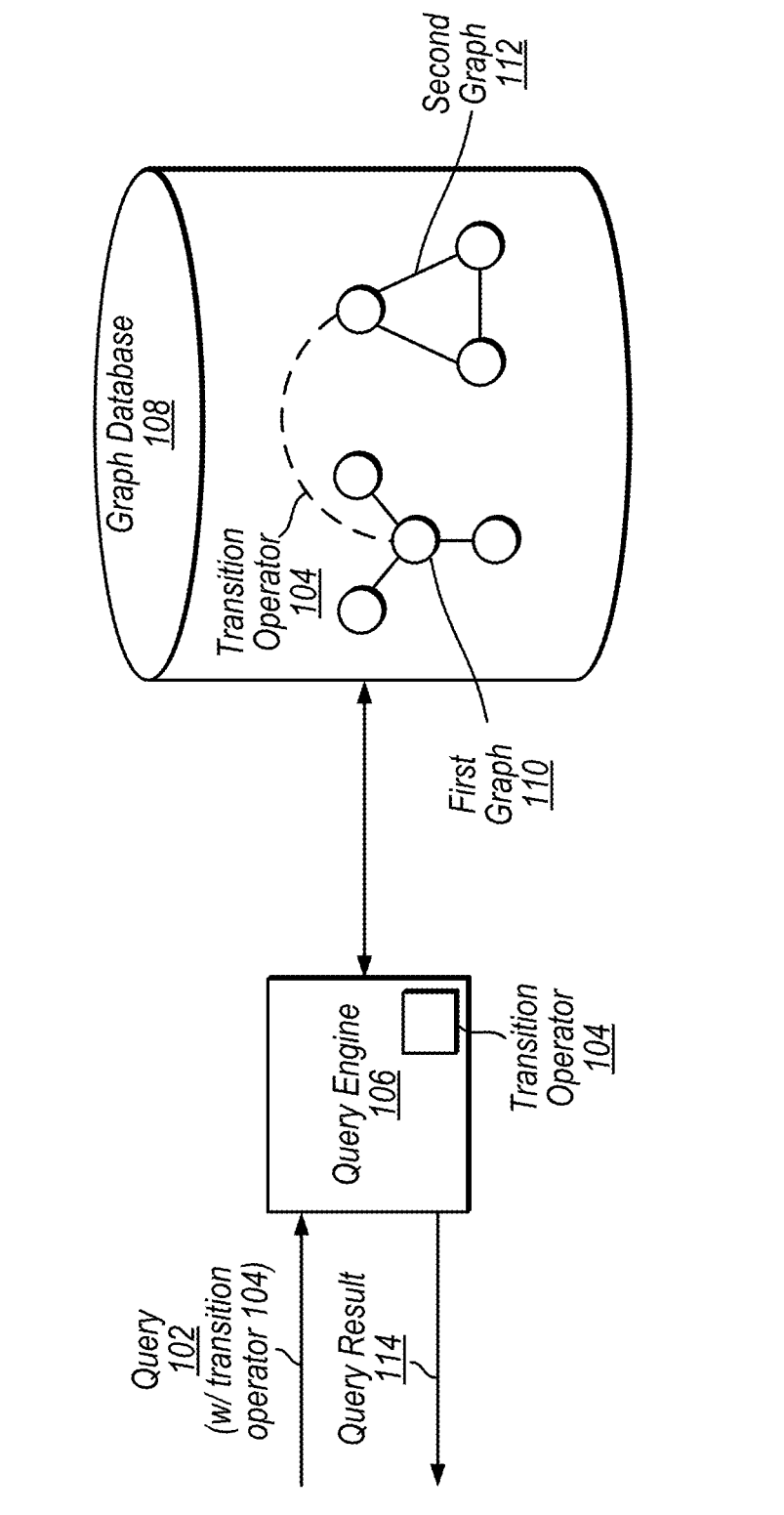
FIG. 1 is a block diagram illustrating an example query system, according to some embodiments.

Traditional graph query operations may be confined to a single graph. When data spans multiple independently maintained graphs, querying those graphs may require issuing separate queries to each graph and reconciling the results manually. For example, a first graph may store account-centric data (e.g., such as a user's email address, phone number, and/or any account ID such as a PayPal® account ID, etc.), while a second graph may store transactional relationships between accounts (e.g., such as links between PayPal® and associated Venmo® and/or associated Honey® accounts). In some cases, linking data across these graphs may need custom workflows, which can be computationally inefficient and prone to errors. Existing graph query languages (e.g., such as Gremlin), do not provide native support for transitioning between graphs within the same traversal context (traversal operation), which can further complicate cross-graph data analysis. Additionally, as graph databases grow in size and complexity, it is potentially challenging to maintain efficient and reliable operations. For instance, ensuring that data is valid before inserting it into a production graph may be needed for preventing errors and inconsistencies. Some approaches lack the flexibility to validate data in real-time without risking the integrity of the production environment. Furthermore, advanced features such as associating confidence scores with edges (e.g., representing the strength or reliability of relationships between nodes) may be difficult to implement across multiple graphs, further limiting the ability to perform complex analyses in a single query.

The present disclosure describes techniques for enabling seamless transitions between graphs within a single traversal context (single traversal operation) using a specialized query operator. In some embodiments, a query for a graph database includes a transition operator, which causes a query engine to transition from a first graph to a second graph. For example, the query may start with a node in the first graph (e.g., representing a user's email address) and traverse to a second node in the same graph (e.g., the corresponding PayPal® account ID). The transition operator may then enable the query engine to transition to the second graph (e.g., using a retrieved PayPal® account ID) to identify related nodes (e.g., Venmo® or Honey® accounts). By maintaining a single traversal context throughout this process, the system may eliminate the need for separate queries, which may streamline cross-graph operations and reduce the complexity of data retrieval. In another embodiment, the system can incorporate confidence scores associated with edges in the graph. These scores may represent the strength or reliability of relationships between nodes and can be used to filter or prioritize results. By way of example, a query may retrieve only those nodes connected by edges with confidence scores above a predetermined threshold, such that returned data is both relevant and reliable. This feature may be particularly useful in applications where the relationships between nodes are inferred or probabilistic, such as linking user accounts across multiple platforms based on shared attributes.

The techniques described herein may offer several benefits. For example, the use of a transition operator for cross-graph queries may reduce computational overhead by eliminating the need for independent queries and manual data reconciliation. By maintaining a single traversal context, the system may allow data to be retrieved efficiently and coherently, even when spanning multiple graphs. In some aspects, the ability to assign and utilize confidence scores for edges can enable more nuanced data analysis, allowing for the filtering and prioritization of results based on the strength of relationships. In some instances, the inclusion of mirror graphs for data validation may assist with ensuring the integrity of production graphs. By way of example, new data may be temporarily inserted into a mirror graph and validated through traversal operations before being added to the production graph. This process may prevent malformed or incomplete data from disrupting the accuracy of graph-based analyses. By addressing these challenges, the disclosed systems and methods may enable robust and scalable graph database operations that support complex use cases including, but not limited to, cross-graph queries, confidence-based filtering, and data validation. These innovations may be valuable in scenarios involving large, interconnected datasets, where efficient and reliable querying is essential for decision-making and analysis.

While specific examples in this disclosure refer to PayPal®, Venmo®, and Honey® accounts for illustrative purposes, the described techniques are not limited to these platforms. Those skilled in the art will appreciate that the disclosed techniques can be applied to any types of accounts or entities including, but not limited to, bank accounts, social media profiles, e-commerce accounts, cryptocurrency wallets, or other data entities stored in graph databases. The principles of cross-graph querying, confidence-based filtering, and data validation can be extended to any scenario where relationships between distinct types of data entities are represented in interconnected graphs. This broad applicability makes the disclosed systems and methods versatile across various industries and use cases.

Turning now to FIG. 1, a block diagram illustrating an example query system 100 is depicted. In the illustrated embodiment of FIG. 1, query system 100 includes query engine 106 and graph database 108. In some embodiments, query engine 106 is operable to receive a query 102 and produce a query result 114 based on operations performed on graph database 108. In some examples, query 102 includes transition operator 104.

In some aspects, within query engine 106, transition operator 104 (e.g., within query 102, such as the ".toV" operator as discussed in FIG. 2 below) facilitates transitions between graphs (e.g., first graph 110 to second graph 112) during query processing. In some embodiments, first graph 110 may be associated with account-centric data, such as user profiles, emails addresses, and/or phone numbers while second graph 112 may be associated with related account data, such as linked social media accounts, transaction histories, or memberships in professional organizations. Those skilled in the art will appreciate additional examples of data associations for first graph 110 and second graph 112. This will be described in further detail with respect to FIG. 2 below. In response to receiving query 102, query engine 106 may process a first portion of a traversal context within a first graph 110. For example, within first graph 110, a transition or movement may occur from one node to another node, and data may be retrieved (e.g., intermediary data such as a PayPal® account ID). In some examples, transition operator 104 may transition to second graph 112 (e.g., to a node associated with the PayPal® account ID in the intermediary data retrieved from first graph 110). For instance, this transition may occur within the same traversal context, such that that the data retrieved from first graph 110 is seamlessly applied to the traversal within second graph 112. In some instances, a transition may then occur from the node in second graph 112 associated with the intermediary data to one or more nodes within second graph 112 (e.g., a Venmo® and/or Honey® account or any type of account associated with the account ID from the intermediary data).

In some examples, graph database 108 stores first graph 110 and second graph 112. The transition between these graphs may be facilitated by transition operator 104 (e.g., represented in FIG. 1 by the dotted line connecting nodes across first graph 110 and second graph 112). For example, as discussed above, query engine 106 may transition from a node in first graph 110 (e.g., containing account-centric data) to a node in second graph 112 (e.g., containing transactional data), using intermediary data retrieved during a first portion of the traversal context. In some instances, this ability to transition between graphs within the same traversal context may simplify querying and reduce the need for multiple independent queries.

In some examples, query result 114 represents the data retrieved from second graph 112 such as relevant account data (e.g., Honey® or Venmo® account data) associated with the intermediary data (e.g., PayPal® account ID)

retrieved from first graph 110. In some embodiments, the architecture of query system 100 allows for efficient cross-graph querying, enabling streamlined operations and data retrieval across independently maintained graphs.

Figure 2:
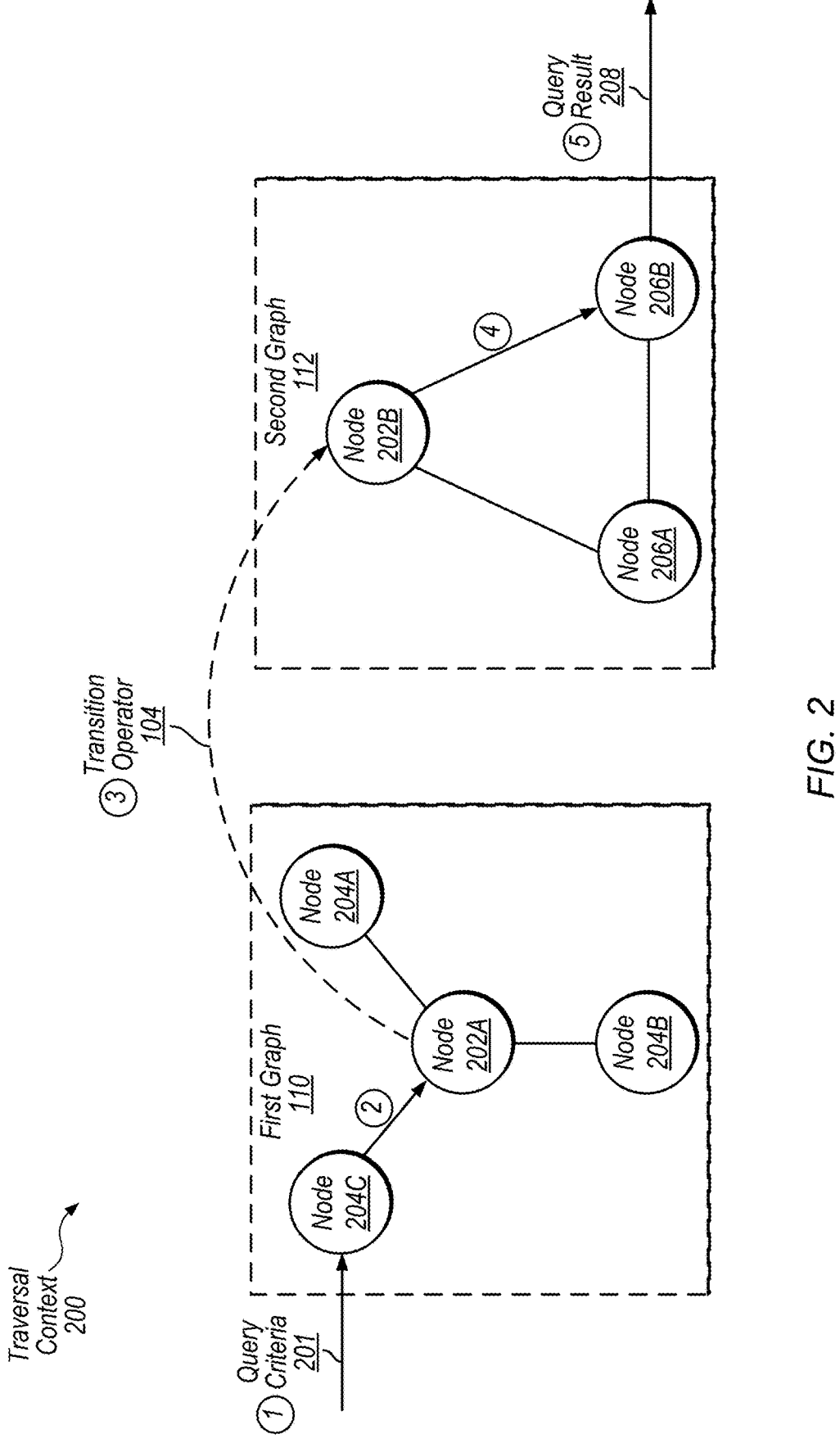
FIG. 2 is a block diagram illustrating an example traversal context, according to some embodiments.

Turning now to FIG. 2, a block diagram illustrating an example traversal context 200 (traversal operation 200) is depicted. In the illustrated embodiment of FIG. 2, traversal context 200 includes first graph 110, second graph 112, and transition operator 104. FIG. 2 illustrates an example step-by-step process of querying and transitioning between two graphs to retrieve data relevant to query criteria 201.

In step 1, query criteria 201 may be received by first graph 110. First graph 110 may represent account-centric data, which includes one or more nodes (e.g., node 202A and nodes 204A-C). For example, node 202A may represent an account ID, such as a PayPal® account ID, and one or more nodes 204 may represent user data associated with that account ID. Examples of user data stored in nodes 204 may include, but are not limited to, email addresses (e.g., node 204A), phone numbers (e.g., node 204B), physical addresses (e.g., node 204C), profile pictures, transaction history, and/ or linked bank account information. Those skilled in the art will appreciate additional examples of user data that may also be represented by any of nodes 204. The query criteria 201 may specify a particular account ID to search for, which may be stored in node 202A.

In step 2, traversal context 200 may progress within first graph 110. For example, as shown by the arrow from node 204C to node 202A, the traversal may involve locating a specific account ID (e.g., the PayPal® account ID) based on user data stored in node 204C (e.g., such as an email address, phone number, physical address, etc.). The query engine may process this traversal and retrieve intermediary data (e.g., the PayPal® account ID stored in node 202A) from first graph 110.

In step 3, transition operator 104 may facilitate a transition from first graph 110 to second graph 112, as shown by the dotted arrow illustrated in FIG. 2. In some examples, second graph 112 may represent additional account relationships associated with a user, such as Venmo® accounts, Honey® accounts, Zelle® accounts, and/or credit card accounts. For instance, node 202B in second graph 112 may store the same PayPal® account ID retrieved from node 202A in first graph 110, serving as a link to related accounts.

In step 4, the traversal context continues within second graph 112. For example, as shown by the arrow from node 202B to node 206B, the traversal may identify and retrieve other account data, such as a Honey® account and/or a Venmo® account, associated with the PayPal® account ID. Nodes 206A and 206B may represent these related accounts. For example, node 206A might store Honey® account data, while node 206B could store Venmo® account data.

Those skilled in the art will appreciate that each node in first graph 110 and/or second graph 112 may represent a database or datastore containing information specific to its type. For example, node 206B (e.g., representing Venmo® accounts) may include a database of Venmo® account IDs, along with associated metadata such as transaction histories, linked email addresses, account verification statuses, transaction frequency, and/or linked bank accounts. Furthermore, each node may include one or more internal nodes or hierarchical data structures for organizing the stored information. For instance, internal nodes within node 206B might represent subcategories including, but not limited to, user credentials, payment methods, and/or account preferences. These internal structures may facilitate efficient storage, optimized querying, and seamless retrieval of both highlevel account data and detailed metadata as needed, thereby supporting the scalability and integrity of traversal context 200.

In step 5, query result 208 may be retrieved from second graph 112. For example, query result 208 may include the Venmo® and/or Honey® account data associated with the PayPal® account ID retrieved from nodes 202A and 202B. Query engine 106 may execute this retrieval using a query language such as Gremlin. For example, the query may specify traversal criteria (e.g., searching for nodes connected to a specific account ID) and retrieve the corresponding data stored in nodes 206A-B. In some examples, Gremlin or similar query languages may allow for advanced operations such as filtering based on node attributes, performing aggregation, or retrieving associated metadata. In some embodiments, a ".toV" operator in the following example Gremlin query may represent transition operator 104:

> "g.V(    )hasLabel('Email').has('emailAddress',_email)
> .out('EmailPPAccountUsedBy').toV('Commerce-
> Graph','PPAccount').both('PPAccountVenmoAc-
> countLynxBroadway').values('i d')".

In some embodiments, traversal context 200 may further include a third graph (not illustrated in FIG. 2). For example, after retrieving data from second graph 112, traversal context 200 may transition to a third graph using a second transition operator (e.g., associated with additional query criteria). This third graph may store supplementary data including, but not limited to, merchant relationships, financial transaction histories, and/or loyalty program information, that is associated with the data retrieved from first graph 110 and second graph 112. Traversing the third graph may allow the query engine to retrieve more comprehensive information while maintaining a seamless traversal context across multiple graphs.

Figure 3:
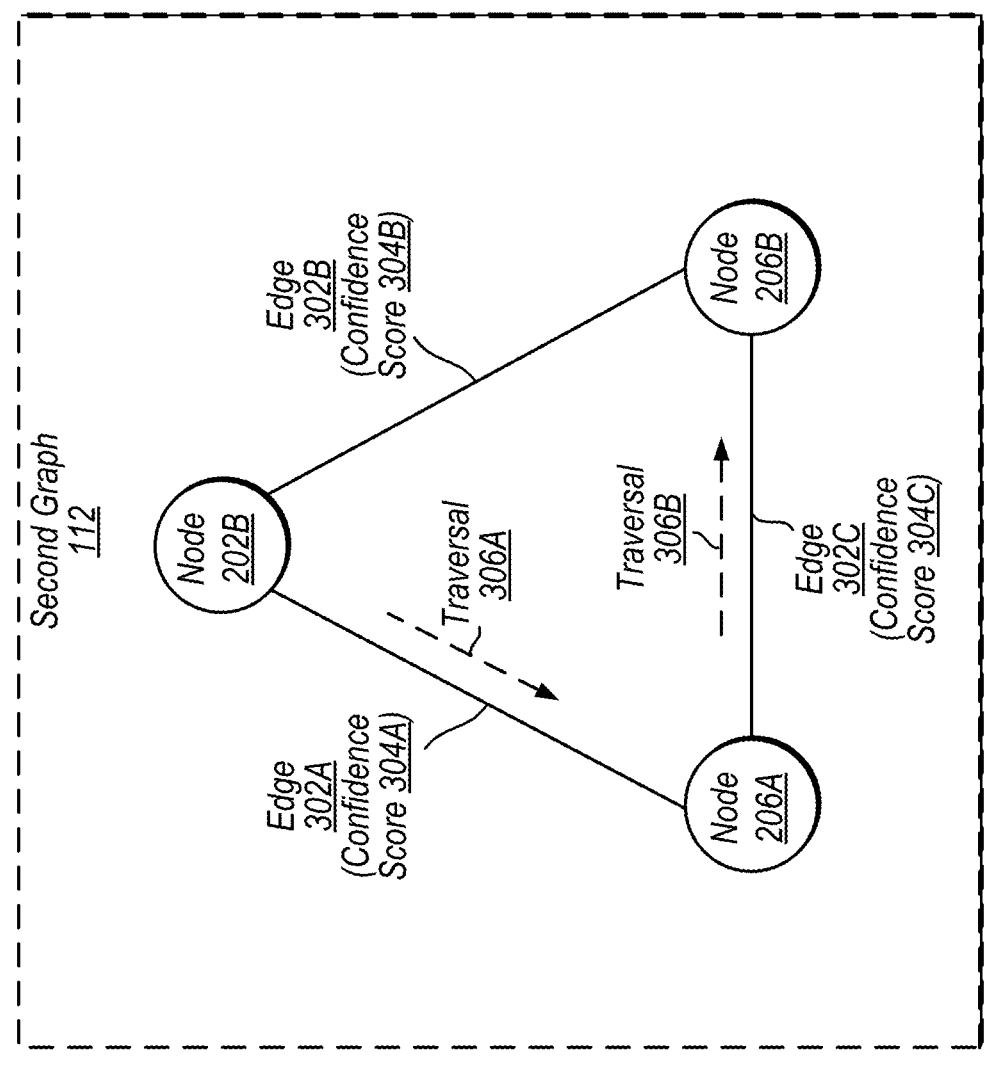
FIG. 3 is a block diagram illustrating an example graph containing nodes with edges and associated confidence scores, according to some embodiments.

Turning now to FIG. 3, a block diagram illustrating an example graph (e.g., second graph 112) containing nodes with edges and associated confidence scores is depicted. In the illustrated embodiment of FIG. 3, second graph 112 includes node 202B and nodes 206A-B, which are interconnected by a set of edges 302. For example, edge 302A connects node 202B to node 206A, edge 302B connects node 202B to node 206B, and edge 302C connects node 206A to node 206B. Each edge 302 may be associated with a corresponding confidence score 304 (e.g., confidence scores 304A-C corresponding to edges 302A-C), which may indicate a level of confidence in the relationship between the nodes connected by the edge.

In some aspects, confidence scores 304 may provide a measure of how likely the nodes are to be related or associated based on the underlying data in second graph 112. For instance, confidence scores 304 may be calculated based on shared attributes, historical data, and/or statistical correlations. In some examples, confidence scores 304 could reflect the strength of an inferred relationship, such as how closely two accounts (e.g., PayPal® and Venmo®) accounts) are linked (e.g., accounts from a family member, friend, colleague or the account holder themselves associated with an account). They may also indicate the reliability of shared data, such as overlapping email addresses, phone numbers, or physical addresses between accounts. Additionally, confidence scores 304 may represent relationships inferred from behavioral data, such as shared transaction histories or frequently co-occurring interactions.

In the example illustration depicted in FIG. 3, two traversals, 306A and 306B, are illustrated as dotted arrows. Traversal 306A may cross edge 302A between node 202B and node 206A, and traversal 306B may cross edge 302C between node 206A and node 206B. These traversals 306 may indicate that the confidence scores for the corresponding edges (e.g., confidence score 304A for edge 302A and confidence score 304C for edge 302C) meet or exceed a pre-determined threshold. By way of example, confidence score 304A above the threshold may suggest that node 202B (e.g., representing a PayPal® account ID) is associated with node 206A (e.g., representing a Venmo® account). Similarly, confidence score 304C above the threshold may indicate a reliable association between node 206A (e.g., representing a Venmo® account) and node 206B (e.g., representing a Honey® account).

In some aspects, edges 302 with confidence scores 304 below a pre-determined threshold may not be traversed within the traversal context. For example, edge 302B between node 202B and node 206B does not include an arrow, indicating that confidence score 304B is below the threshold. This lack of traversal may imply that the relationship between node 202B and node 206B is not deemed strong or reliable enough to warrant inclusion in the returned result data (e.g., query result 114) for a particular query (e.g., query 102).

In some cases, the pre-determined threshold for confidence scores may vary depending on the application or use case. For example, in a fraud detection system, the threshold may be set higher to ensure that only highly reliable relationships are considered, thereby reducing the likelihood of false positives. In contrast, in a recommendation system, the pre-determined threshold may be set lower to allow for the inclusion of broader associations, which could help uncover additional linked accounts or entities that may not have strong direct relationships but are still contextually relevant.

In some embodiments, traversals such as 306A and 306B may represent steps in the traversal context for querying second graph 112. For instance, traversal 306A may retrieve data from node 206A (e.g., Venmo® account data) related to node 202B (e.g., a PayPal® account ID). Similarly, traversal 306B may retrieve data from node 206B (e.g., Honey® account data) based on its association with node 206A. Depending on the query criteria and the relationships represented by edges 302, these traversals 306 may also retrieve supplemental information or metadata from nodes.

Figure 4:
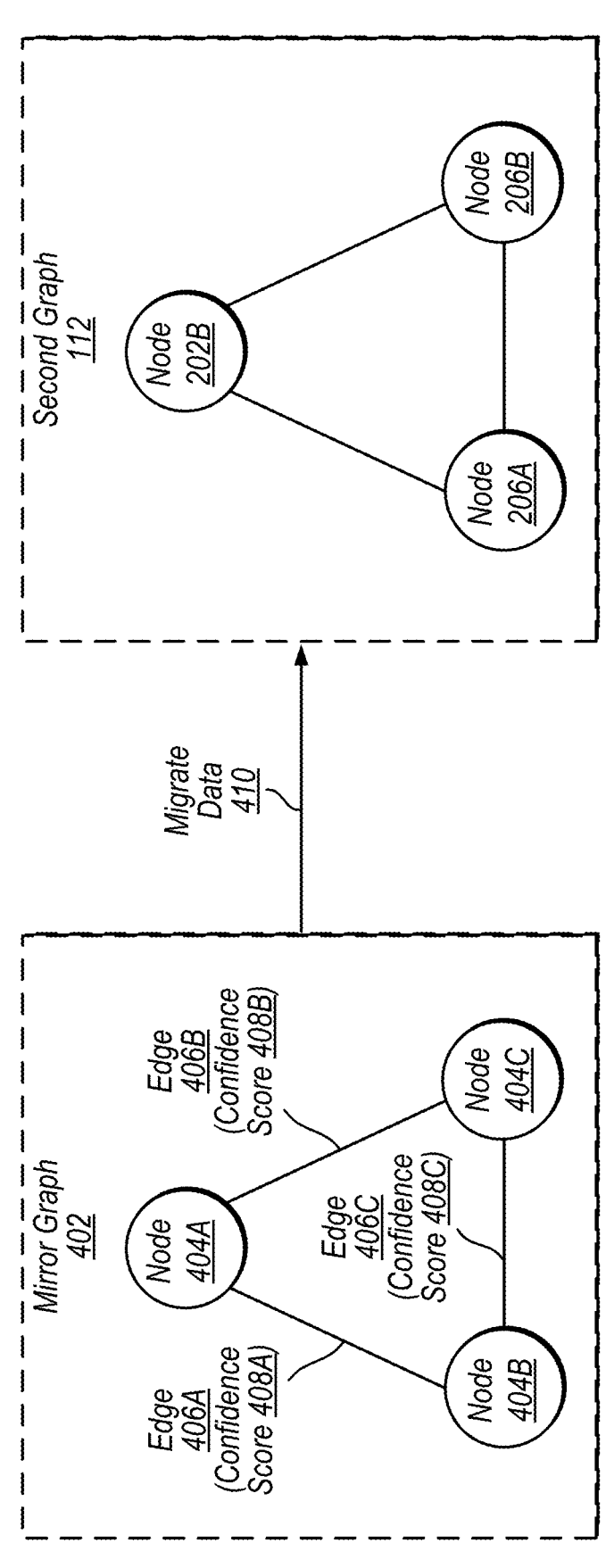
FIG. 4 is a block diagram illustrating an example of a data validation operation, according to some embodiments.

Turning now to FIG. 4, a block diagram illustrating an example of a data validation operation 400 is depicted. In the illustrated embodiment of FIG. 4, data validation operation 400 includes mirror graph 402 and second graph 112. In some aspects, mirror graph 402 can be generated as a temporary or test environment to validate a set of data prior to its insertion into second graph 112. While FIG. 4 illustrates second graph 112, in other embodiments the same validation process may apply to first graph 110 and a corresponding analogous mirror graph.

In some embodiments, mirror graph 402 includes node 404A, node 404B, and node 404C, which are connected by edges 406A-C. Each edge 406 may include an associated confidence score 408 (e.g., confidence scores 408A-C corresponding to edges 406A-C). For example, edge 406A connects node 404A and node 404B and has a confidence score 408A. Similarly, edge 406B connects node 404A and node 404C, while edge 406C connects node 404B and node 404C. In some examples, node 404A may represent a PayPal® account ID, similar to node 202B in second graph 112, while nodes 404B and 404C may represent associated accounts such as Venmo® or Honey® accounts.

In some cases, the data validation process may involve evaluating whether the structure and data of mirror graph 402 meet the criteria for successful integration with second graph 112. By way of example, validation may include determining if mirror graph 402 has the same structure as second graph 112 (e.g., such as the same number of nodes and edges), and verifying that all nodes and edges are present and properly populated. For instance, if node 404B is missing or empty (e.g., no associated data for a Venmo® account), the data may be deemed invalid.

Additionally, the validation process may involve querying mirror graph 402 to simulate transitions between nodes and evaluate the consistency of relationships. For example, using a query with a transition operator, the system may check the relationships between node 404A and nodes 404B and 404C via edges 406A and 406B, respectively. If the relationships or transitions are malformed (e.g., missing expected connections or exhibiting duplicate entries), the data may fail validation. For example, edge 406C connecting node 404B and node 404C may have a confidence score 408C that does not meet a pre-determined threshold, indicating that the relationship between these nodes 404 is not strong enough to justify inclusion in second graph 112.

In some embodiments, the validation process may identify other potential issues, such as structural mismatches or extraneous data. For instance, if mirror graph 402 contains an extra node 404 not present in second graph 112 (e.g., a fifth data item with no corresponding placement in the graph structure) or one or more missing nodes 404, this inconsistency may render the data invalid. Alternatively, if the overall structure of mirror graph 402 (e.g., a 4-node structure) does not align with the expected structure of second graph 112 (e.g., a 3-node structure), the data may be rejected and/or determined to be invalid.

In some examples, if the data is deemed valid (e.g., as determined by the validation process), it may be migrated to second graph 112. This migration is depicted in FIG. 4 as migrate data 410. The migration process may involve either inserting the validated mirror graph 402 into second graph 112 in its entirety or transferring data node by node. For example, node 404A in mirror graph 402 (e.g., representing a PayPal® account ID) may be inserted as node 202B in second graph 112, while nodes 404B and 404C (e.g., representing Venmo® and Honey® accounts) may be inserted as nodes 206A and 206B, respectively. The corresponding edges and confidence scores may also be migrated to maintain the relationships between the nodes.

In the illustrated embodiment, FIG. 4 demonstrates how the use of mirror graph 402 allows valid and consistent data to be added to second graph 112. By validating data in a separate environment, the system may prevent one or more errors including, but not limited to, malformed relationships, missing nodes, and/or duplicate entries from propagating into the production graph (e.g., second graph 112). In some instances, this approach can enhance the integrity and reliability of second graph 112 while maintaining flexibility in how data is structured and validated. In some embodiments, this validation process may also improve system scalability by allowing mirror graph 402 to handle complex data structures or relationships before final insertion into the production graph.

Turning now to FIG. 5A, a flow diagram of a method 500 is shown. Method 500 is one embodiment of a method performed by a computing system 600. Method 500 may be performed by executing a set of program instructions stored on a non-transitory computer-readable medium.

Method 500 begins in step 505 with the computing system receiving a query for a graph database, wherein the query comprises a transition operator that causes a query engine to transition from a first graph to a second graph. For example, query system 100 may receive query 102, which includes a transition operator 104, via query engine 106. Transition operator 104 can facilitate the transition between first graph 110 (e.g., containing account-centric data such as PayPal® account IDs) and second graph 112 (e.g., containing related account data such as Venmo® or Honey® accounts) as depicted in FIG. 1.

In step 510, the computing system initiates, by the query engine, a first portion of a traversal context from a first node of the first graph based on a set of criteria specified in the query. For example, query engine 106 (as illustrated in FIG. 1) may process query 102 by initiating traversal context 200 (as depicted in FIG. 2) to locate a first node (e.g., node 202A in first graph 110) based on query criteria 201. The query criteria may include parameters such as an email address or phone number, and the traversal context may identify the corresponding account ID (e.g., PayPal® account ID) stored in a node (e.g., node 202A). In some aspects, the first portion of traversal context 200 may refer to the portion within first graph 110.

In step 515, the computing system, in response to the transition operator, performs, by the query engine, a second portion of the traversal context from a second node in the second graph. For example, query engine 106 (as illustrated in FIG. 1) may use transition operator 104 to transition from first graph 110 to second graph 112 and initiate traversal context 200 within second graph 112 starting at a second node (e.g., node 202B). In some aspects, the second portion of the traversal context may be within second graph 112. In some examples, the second node is identified based on intermediary data retrieved from the first portion of the traversal context. For example, the second node (e.g., node 202B) may be identified based on intermediary data retrieved during the first portion of the traversal context in first graph 110 (e.g., data retrieved from node 202A from first graph 110).

In step 520, the computing system returns, for the query, a result that includes result data retrieved from the second portion of the traversal context. For example, query engine 106 (as illustrated in FIG. 1) may retrieve result data from nodes 206A and/or 206B in second graph 112 (e.g., representing associated Honey®, Venmo® account data) during the second portion of traversal context 200. This result data may then be returned as query result 114, providing the information associated with the user's PayPal® account ID retrieved during the first portion of the traversal context.

In some embodiments, the second graph comprises a set of edges, wherein a first edge of the set of edges has a first confidence score indicative of a relationship between two first nodes within the second graph, and wherein a second edge of the set of edges has a second confidence score indicative of a relationship between two second nodes within the second graph. For example, second graph 112 (as illustrated in FIG. 3) may include edges 302A and 302C, where each edge is associated with a confidence score (e.g., confidence scores 304A and 304C, respectively). Confidence scores 304A and 304C may indicate the strength or reliability of the relationships between node 202B and node 206A (for edge 302A) and between node 206A and node 206B (for edge 302C), respectively. In some cases, performing the second portion of the traversal context is based on the first and second confidence scores. For example, traversal context 200 within second graph 112 (as illustrated in FIG. 3) may include traversals across multiple edges, such as edge 302A (connecting node 202B to node 206A) and edge 302C (connecting node 206A to node 206B). These traversals may be performed when the associated confidence scores (e.g., confidence scores 304A and 304C) meet or exceed a pre-determined threshold. This may enable the query engine to retrieve result data from one or more nodes (e.g., both Honey® and Venmo® account data from nodes 206A and 206B) during the second portion of the traversal context.

In some embodiments, method 500 further includes steps for the computing system retrieving, via the query engine, a set of confidence scores associated with edges in the second graph and determining, via the query engine, that a particular confidence score within the set of confidence scores satisfies a pre-determined threshold, wherein the result data includes data identified based on the determining. For example, query engine 106 (as illustrated in FIG. 1) may retrieve confidence scores 304A and 304C (as depicted in FIG. 3) associated with edges 302A and 302C in second graph 112. The query engine may then determine whether these confidence scores satisfy a pre-determined threshold. If confidence scores 304A and 304C meet or exceed the threshold, the result data may include information from nodes 206A and 206B (e.g., Honey® and Venmo® account data) that are connected by these edges.

In some embodiments, method 500 further includes steps for the computing system receiving a request to add a set of data to the second graph, and prior to inserting the set of data to the second graph, validating the set of data including: generating a mirror graph comprising a structure associated with the second graph; inserting the set of data into the mirror graph; and determining a validity of the set of data based on a second query that comprises a second transition operator that causes the query engine to transition between the mirror graph and the second graph. For example, query engine 106 (as illustrated in FIG. 1) may receive a request to add a new set of data, such as user account details, to second graph 112. In some examples, prior to directly inserting this data into second graph 112, the computing system may generate a mirror graph 402 (as depicted in FIG. 4) with a structure analogous to second graph 112. Mirror graph 402 may include nodes 404A-C and edges 406A-C, which may be designed to mimic the organizational relationships and structures of second graph 112. In some cases, the set of data may be temporarily inserted into mirror graph 402 to evaluate or determine its validity by populating nodes (e.g., nodes 404A-C for a PayPal® account, Venmo® account, and/or Honey® account) and establishing edges (e.g., edges 406A-C) with associated confidence scores (e.g., confidence scores 408A-C) to represent relationships between the accounts. In some embodiments, using a second query with a second transition operator (e.g., similar to transition operator 104), the query engine may simulate traversals between mirror graph 402 and second graph 112 to verify structural and relational consistency. Validation may ensure that all expected nodes and edges are present and populated, that confidence scores meet a pre-determined threshold, and that there are no structural inconsistencies such as extraneous or missing nodes. If successfully validated, the data may be migrated to second graph 112 either node by node or as an entire graph.

In some embodiments, method 500 further includes steps for the computing system, based on the validity of the set of data, inserting the mirror graph into the second graph. For example, if the set of data in mirror graph 402 is determined to be valid, it may be migrated to second graph 112, as depicted by migrate data 410 in FIG. 4. This migration process may involve transferring nodes 404A-C and their associated edges 406A-C from mirror graph 402 into second graph 112. For instance, node 404A in mirror graph 402 (e.g., representing a PayPal® account) may be inserted as node 202B in second graph 112, while nodes 404B and 404C (e.g., representing Venmo® and Honey® accounts) may be inserted as nodes 206A and 206B, respectively. The corresponding edges and confidence scores may also be transferred to maintain the relationships between nodes. In some embodiments, the returned result comprises the inserted set of data. For example, after the set of data is validated and successfully migrated from mirror graph 402 to second graph 112 (e.g., as shown by migrate data 410 in FIG. 4), query engine 106 may return a query result that includes the inserted data. By way of example, the returned result may comprise data corresponding to nodes 404A-C(e.g., PayPal®, Venmo®, and Honey® accounts) now represented as nodes 202B, 206A, and 206B in second graph 112.

In some embodiments, performing the second portion of the traversal context comprises traversing from the second node to a third node and from the second node to a fourth node, wherein the result data includes data from the third node and the fourth node. For example, as depicted in FIG. 2, query engine 106 may perform the second portion of traversal context 200 within second graph 112 by traversing from node 202B (e.g., representing a PayPal® account) to node 206A (e.g., representing a Venmo® account) and from node 202B to node 206B (e.g., representing a Honey® account). The traversal context may enable the retrieval of data from both node 206A and node 206B, allowing the result data to include account information for both the Venmo® and Honey® accounts linked to the PayPal® account represented by node 202B.

In some embodiments, method 500 further includes steps for the computing system parsing the query, wherein the parsing includes identifying a second transition operator associated with a third graph and after performing the second portion of the traversal context, performing a third portion of the traversal context from a third node in the third graph based on the second transition operator. For example, query engine 106 (as illustrated in FIG. 1) may parse query 102 to identify a second transition operator that specifies a transition to a third graph (not illustrated in FIG. 2). After completing the second portion of traversal context 200 within second graph 112 (e.g., retrieving data from nodes 206A and/or 206B), the query engine may initiate a third portion of the traversal context from a third node (e.g., a node in a third graph) based on the intermediary data retrieved from second graph 112. In some aspects, the second transition operator may function similarly to transition operator 104 but is operable to enable seamless traversal into the third graph while maintaining the same traversal context.

In some embodiments, method 500 further includes steps for the computing system, in response to the transition operator: retrieving the intermediary data from a destination node in the first graph based on the first portion of the traversal context, identifying the second node based on the second node including the intermediary data and transitioning from the destination in the first graph to the second node in the second graph. For example, query engine 106 (as illustrated in FIG. 1) may retrieve intermediary data from a destination node in first graph 110 (e.g., node 202A in FIG. 2). The intermediary data, such as a PayPal® account ID, may correspond to the criteria specified in query 102. Query engine 106 may then identify the second node (e.g., node 202B in second graph 112) by determining that the second node includes the retrieved intermediary data. Using transition operator 104, query engine 106 can transition from the destination node (e.g., node 202A in first graph 110) to the identified second node (e.g., node 202B in second graph 112), enabling the second portion of traversal context 200.

Turning now to FIG. 5B, a flow diagram of a method 530 is shown. Method 530 is one embodiment of a method performed by a computing system (e.g., computing system 600) and may be performed by executing a set of program instructions stored on a non-transitory computer-readable medium.

Method 530 begins in step 540 with the computing system (e.g., computing system 600) receiving a query for a graph database, wherein the query comprises a transition operator that causes a query engine to transition from a first graph to a second graph. For example, query engine 106 (as illustrated in FIG. 1) may receive query 102, which includes transition operator 104, to facilitate transitioning traversal context 200 from first graph 110 to second graph 112.

In step 540, the computing system initiates, by the query engine, a first portion of a traversal operation from a first node of the first graph to a second node of the first graph based on a set of criteria specified in the query. For example, query engine 106 (as illustrated in FIG. 1) may initiate traversal context 200 within first graph 110, traversing from a first node (e.g., node 204C) containing user data, such as an email address, to a second node (e.g., node 202A) representing an account ID, such as a PayPal® account ID, based on query criteria 201.

In step 545, the computing system, in response to the transition operator, transitions from the second node to a third node of the second graph. For example, query engine 106 (as shown in FIG. 1) may use transition operator 104 to transition from the second node in first graph 110 (e.g., node 202A) to a third node in second graph 112 (e.g., node 202B), representing related account data such as a Venmo® account.

In step 550, the computing system performs, by the query engine, a second portion of the traversal operation from the third node in the second graph to a fourth node in the second graph, wherein the third node is identified based on intermediary data retrieved from the second node. For example, query engine 106 (as shown in FIG. 1) may retrieve intermediary data from node 202A in first graph 110, identify node 202B in second graph 112 based on this data, and traverse from node 202B to node 206A (e.g., representing a Venmo® account) to retrieve associated data.

In step 555, the computing system, returns, for the query, a result that includes result data retrieved from the second portion of the traversal operation. For example, query engine 106 may return result data retrieved from nodes 206A and 206B in second graph 112, such as Venmo® and Honey® account details associated with the PayPal® account ID from node 202B.

In some embodiments, the first portion of the traversal operation includes traversals through one or more intermediary nodes between the first node and the second node. For example, traversal context 200 may include traversals through nodes 204A-C in first graph 110 (e.g., nodes storing user data such as email addresses, phone numbers, or physical addresses) before reaching the first node (e.g., node 202A, representing a PayPal® account ID). In some cases, one or more intermediary nodes not explicitly illustrated in first graph 110 may also be traversed to satisfy the query criteria.

Turning now to FIG. 5C, a flow diagram of a method 560 is shown. Method 560 is one embodiment of a method performed by a computing system (e.g., computing system

600) and may be performed by executing a set of program instructions stored on a non-transitory computer-readable medium.

In step 565, the computing system receives a graph database query that comprises a transition operator that causes a database query engine to transition from a first graph to a second graph. For example, query engine 106 (as illustrated in FIG. 1) may receive query 102, which includes a transition operator (e.g., transition operator 104) to facilitate seamless transitions between first graph 110 and second graph 112 during the query execution.

In step 570, the computing system initiates a first portion of a traversal operation from a first node of the first graph based on a set of criteria specified in the query. For example, query engine 106 (as illustrated in FIG. 1) may initiate traversal context 200 (as depicted in FIG. 2) from a first node (e.g., node 202A in first graph 110) based on query criteria 201, such as a user's email address or phone number.

In step 575, the computing system, in response to the transition operator: retrieves intermediary data from a destination node in the first graph, identifies a second node in the second graph associated with the intermediary data, performs a second portion of the traversal operation from the second node in the second graph, and returns for the graph database query a result that includes result data retrieved from the second portion of the traversal operation. For example, query engine 106 (as shown in FIG. 1) may retrieve intermediary data (e.g., a PayPal® account ID) from node 202A in first graph 110, identify node 202B in second graph 112 based on the intermediary data, perform a traversal to nodes 206A and 206B in second graph 112 (e.g., representing Venmo® and Honey® accounts), and return query result 114 containing the associated account data.

Exemplary Computer System

Figure 6:
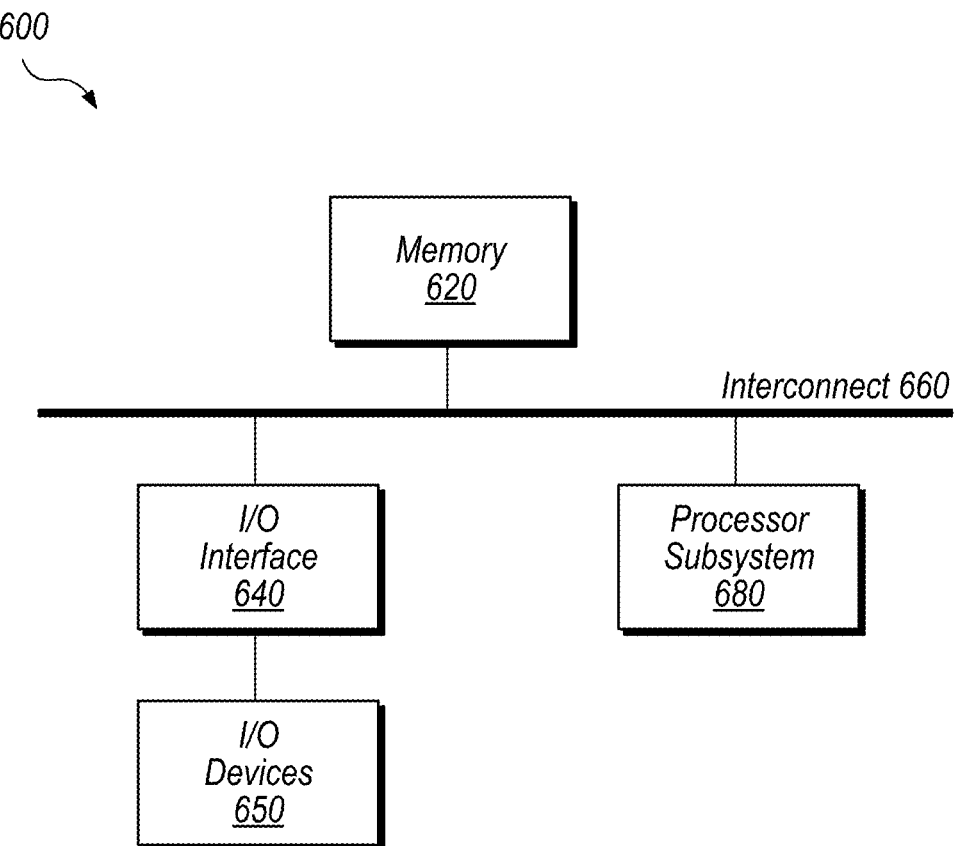
FIG. 6 is a block diagram illustrating elements of an exemplary computer system for implementing techniques described herein.

Turning now to FIG. 6, a block diagram of an exemplary computer system 600, which may implement query system 100 (or one or more components included in query system 100), is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement elements of systems 100 (e.g., elements 106 and 108) may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over Wi-Fi®, Bluetooth®, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory computer-readable medium having program instructions stored thereon that cause a computer system to perform operations comprising:

receiving a query for a graph database, wherein the query comprises a transition operator that causes a query engine to transition from a first graph to a second graph;

initiating, by the query engine, a first portion of a traversal context from a first node of the first graph based on a set of criteria specified in the query;

in response to the transition operator, performing, by the query engine, a second portion of the traversal context from a second node in the second graph, wherein the second node is identified based on intermediary data retrieved from the first portion of the traversal context; and returning, for the query, a result that includes result data retrieved from the second portion of the traversal context.

2. The non-transitory computer-readable medium of claim 1, wherein the second graph comprises a set of edges, wherein a first edge of the set of edges has a first confidence score indicative of a relationship between two first nodes within the second graph, and wherein a second edge of the set of edges has a second confidence score indicative of a relationship between two second nodes within the second graph; and wherein performing the second portion of the traversal context is based on the first and second confidence scores.

3. The non-transitory computer-readable medium of claim 1, wherein the operations further comprise:

retrieving, via the query engine, a set of confidence scores associated with edges in the second graph; and determining, via the query engine, that a particular confidence score within the set of confidence scores satisfies a pre-determined threshold, wherein the result data includes data identified based on the determining.

4. The non-transitory computer-readable medium of claim 1, wherein the operations further comprise:

receiving a request to add a set of data to the second graph;

prior to inserting the set of data to the second graph, validating the set of data including:

generating a mirror graph comprising a structure associated with the second graph;

inserting the set of data into the mirror graph; and determining a validity of the set of data based on a second query that comprises a second transition operator that causes the query engine to transition between the mirror graph and the second graph.

5. The non-transitory computer-readable medium of claim 4, wherein the operations further comprise:

based on the validity of the set of data, inserting the mirror graph into the second graph.

6. The non-transitory computer-readable medium of claim 5, wherein the returned result comprises the inserted set of data.

7. The non-transitory computer-readable medium of claim 1, wherein performing the second portion of the traversal context comprises:

traversing from the second node to a third node and from the second node to a fourth node, wherein the result data includes data from the third node and the fourth node.

8. The non-transitory computer-readable medium of claim 1, wherein the operations further comprise:

parsing the query, wherein the parsing includes identifying a second transition operator associated with a third graph; and after performing the second portion of the traversal context, performing a third portion of the traversal context from a third node in the third graph based on the second transition operator.

9. The non-transitory computer-readable medium of claim 1, wherein the operations further comprise:

in response to the transition operator:

retrieving the intermediary data from a destination node in the first graph based on the first portion of the traversal context;

identifying the second node based on the second node including the intermediary data; and transitioning from the destination node in the first graph to the second node in the second graph.

10. A computer-implemented method, comprising:

receiving a query for a graph database, wherein the query comprises a transition operator that causes a query engine to transition from a first graph to a second graph;

initiating, by the query engine, a first portion of a traversal operation from a first node of the first graph to a second node of the first graph based on a set of criteria specified in the query;

in response to the transition operator, transitioning from the second node to a third node of the second graph;

performing, by the query engine, a second portion of the traversal operation from the third node in the second graph to a fourth node in the second graph, wherein the third node is identified based on intermediary data retrieved from the second node; and returning, for the query, a result that includes result data retrieved from the second portion of the traversal operation.

11. The computer-implemented method of claim 10, wherein the first portion of the traversal operation includes traversals through one or more intermediary nodes between the first node and the second node.

12. The computer-implemented method of claim 10, wherein the second graph comprises a set of edges; and wherein performing the second portion of the traversal operation is based on confidence scores associated with one or more of the set of edges.

13. The computer-implemented method of claim 10, further comprising:

retrieving, via the query engine, a set of confidence scores associated with edges in the second graph; and determining, via the query engine, the result data based on one or more of the set of confidence scores.

14. The computer-implemented method of claim 10, further comprising:

receiving a request to add a set of data to the second graph;

prior to inserting the set of data to the second graph, validating the set of data including:

generating a mirror graph comprising a structure associated with the second graph;

inserting the set of data into the mirror graph; and determining a validity of the set of data based on the inserting.

15. The computer-implemented method of claim 14, further comprising:

based on the validity of the set of data, inserting the set of data into the second graph.

16. A computing system, comprising:

one or more processors;

memory having program instructions stored thereon that are executable by the one or more processors to cause the computing system to perform operations comprising:

receiving a graph database query that comprises a transition operator that causes a database query engine to transition from a first graph to a second graph;

initiating a first portion of a traversal operation from a first node of the first graph based on a set of criteria specified in the query;

in response to the transition operator:

retrieving intermediary data from a destination node in the first graph;

identifying a second node in the second graph associated with the intermediary data;

performing a second portion of the traversal operation from the second node in the second graph; and returning, for the graph database query, a result that includes result data retrieved from the second portion of the traversal operation.

17. The computing system of claim 16, wherein the first portion of the traversal operation includes traversals through one or more intermediary nodes between the first node and the destination node.

18. The computing system of claim 16, wherein performing the second portion of the traversal operation is based on one or more confidence scores assigned to edges in the first graph or the second graph.

19. The computing system of claim 16, wherein the operations further comprise:

retrieving, via the database query engine, a set of confidence scores associated with edges in the first graph or the second graph; and identifying the result data based on a particular confidence score within the set of confidence scores satisfying a pre-determined threshold.

20. The computing system of claim 16, wherein the operations further comprise:

receiving a request to add a set of data to the second graph;

prior to inserting the set of data to the second graph, validating the set of data including:

inserting the set of data into a mirror graph comprising a structure associated with the second graph; and processing a query that comprises a transition operator that causes the database query engine to transition between the mirror graph and the second graph.

* * * * *